United States Patent [19]

Kitagishi et al.

[11] Patent Number: 4,859,040

[45] Date of Patent: Aug. 22, 1989

[54] OPTICAL SYSTEM HAVING GRADIENT-INDEX LENS AND METHOD FOR CORRECTING ABERRATIONS

[75] Inventors: Nozomu Kitagishi, Tokyo; Jun Hattori, Atsugi, both of Japan

[73] Assignee: Canon Kabushiki Kaisha, Tokyo, Japan

[21] Appl. No.: 944,664

[22] Filed: Dec. 19, 1986

[30] Foreign Application Priority Data

Dec. 27, 1985 [JP] Japan ................................. 60-297214

[51] Int. Cl.$^4$ ...................... G02B 3/00; G02B 15/177; G02B 9/60; G02B 9/62
[52] U.S. Cl. .................................. 350/413; 350/320; 350/426; 350/464; 350/465
[58] Field of Search ............... 350/413, 423, 427, 320, 350/464, 465, 426

[56] References Cited

U.S. PATENT DOCUMENTS

| | | | |
|---|---|---|---|
| 3,718,383 | 2/1973 | Moore | 350/413 |
| 4,215,914 | 8/1980 | Muchel et al. | 350/413 |
| 4,639,094 | 1/1987 | Aono | 350/413 |
| 4,684,221 | 8/1987 | Takada | 350/413 |

FOREIGN PATENT DOCUMENTS 60-220305 11/1985 Japan ................................. 350/413

Primary Examiner—Bruce Y. Arnold
Assistant Examiner—Scott J. Sugarman
Attorney, Agent, or Firm—Fitzpatrick, Cella, Harper & Scinto

[57] ABSTRACT

An optical system comprising a plurality of lens components, wherein at least one of the components is a convex lens and has a radial gradient of refractive index in such a cross section that the refractive index increases toward the margin, so that it behaves as a lens of negative power.

5 Claims, 6 Drawing Sheets

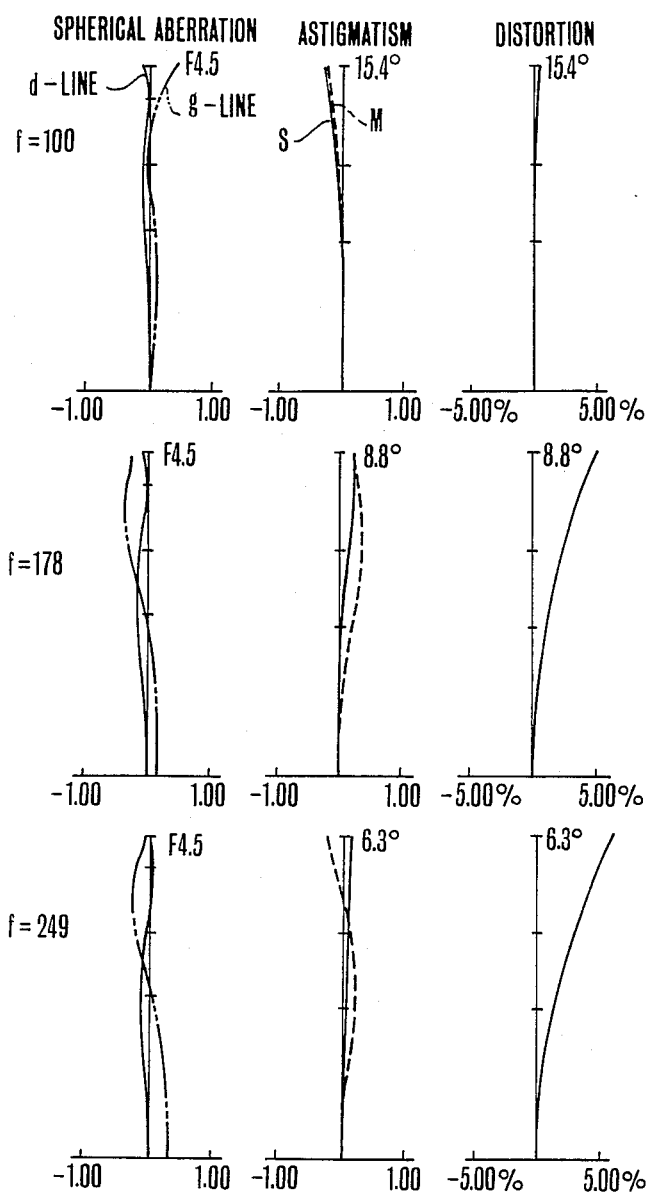

OPTICAL SYSTEM HAVING GRADIENT-INDEX LENS AND METHOD FOR CORRECTING ABERRATIONS

BACKGROUND OF THE INVENTION

1. Field of the Invention:

This invention relates to optical systems using a gradient-index lens, particularly one having a radial gradient of refractive index.

2. Description of the Related Art:

Recently image pickup elements and integrated circuits of smaller size and higher performance have been developed. This trend is reflected in increasing demands for further reducing the bulk and size of the optical system and also further improving the image quality. In accompaniment with it, however, the difficulty of solving the aberrational problem is increasing, and further development has not been fruitful.

To solve the problem, gradient-index lenses come to attract attention. Particularly the radial gradient of refractive index is expected to further develop systems of the class described. In the present state of art, however, no method of its effective application is yet established. As the related art, mention may be made of U.S. patent application Ser. Nos. 800,553, 810,670, 847,670, 847,236.

SUMMARY OF THE INVENTION

An object of the invention is to provide a lens system of improved image quality by utilizing the aberration correction function of a gradient-index lens.

Another object of the invention is to provide a method of correcting a lens system with inclusion of a gradient-index lens for aberrations by specifying the gradient of refractive index and the shape of the surfaces of the gradient-index lens in combination.

The gradient-index lenses are classified into axial and radial types. The axial type has a gradient of refractive index in the axial direction, and the radial type has a gradient of refractive index in a direction perpendicular to the optical axis. Particularly the radial type gradient-index lens has a convergent or divergent action even in the interior of the lens and gets a power (hereinafter called "gradient" power).

In the present invention, on the power arrangement of the lens system at a position where a negative power is necessary, there is provided such a gradient-index lens that the lens shape is convex, but its interior has a gradient of refractive index in such a cross section that the refractive index increases toward the margin, so that with a view to the entirety of the lens, it has a negative power, or a radial gradient-index negative lens, thereby the various aberrations of the lens assembly are advantageously corrected.

In this specification, the phrase "the lens shape is a convex lens" means that the lens thickness of the margin of the optically effective zone becomes smaller than the axial thickness. Therefore, even if the edge of the lens is thickened for the purpose of merely holding the lens, this is not considered to determine the lens shape.

When a gradient-index lens is used in a lens system and gets a negative power from the gradient power, the curvatures of the refracting surfaces of the negative lens can be weakened. For a further advance, the refracting surface can be made convex. When a radial gradient of refractive index having such a cross section that the refractive index increases toward the margin is combined with the convex curvature of the refracting surface as in the gradient-index lens of the invention, the ray is more strongly refracted in the marginal zone of the refracting surface than in the paraxial zone. Therefore, the spherical aberration, astigmatism and coma which would otherwise be under-corrected can be well corrected as the over-correction of the aberrations due to the gradient term of the medium cancels it. Other aberrations such as distortion and Petzval sum are also advantageously corrected.

BRIEF DESCRIPTION OF THE DRAWINGS

FIG. 8 illustrates curves of the lens of FIG. 7.

DETAILED DESCRIPTION OF THE PREFERRED EMBODIMENTS

Figure 1:
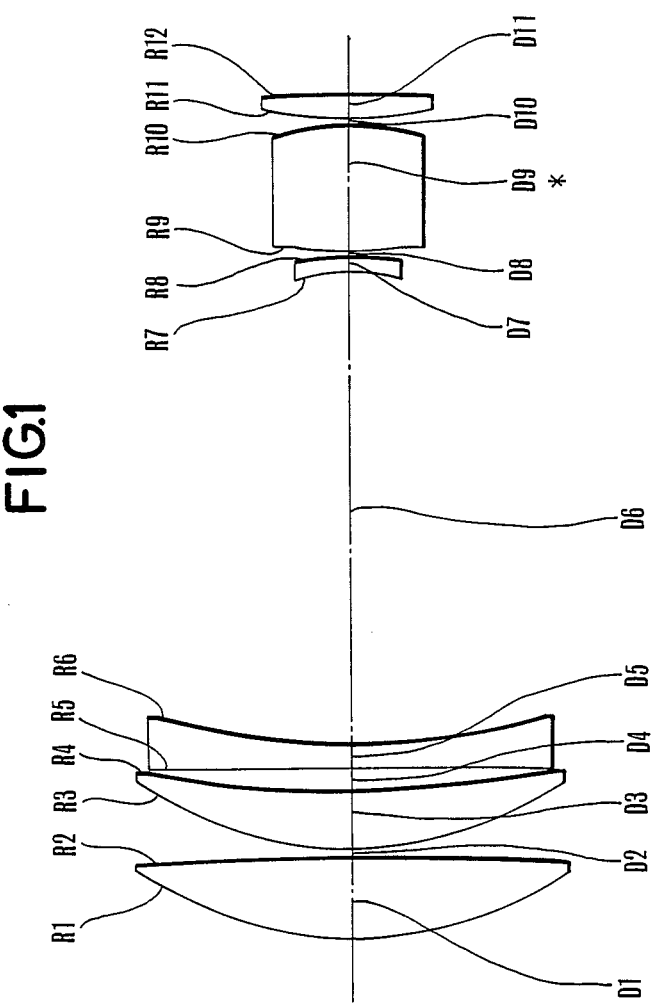
FIG. 1 is a longitudinal section view of a first embodiment of a lens system according to the present invention.
Figure 2:
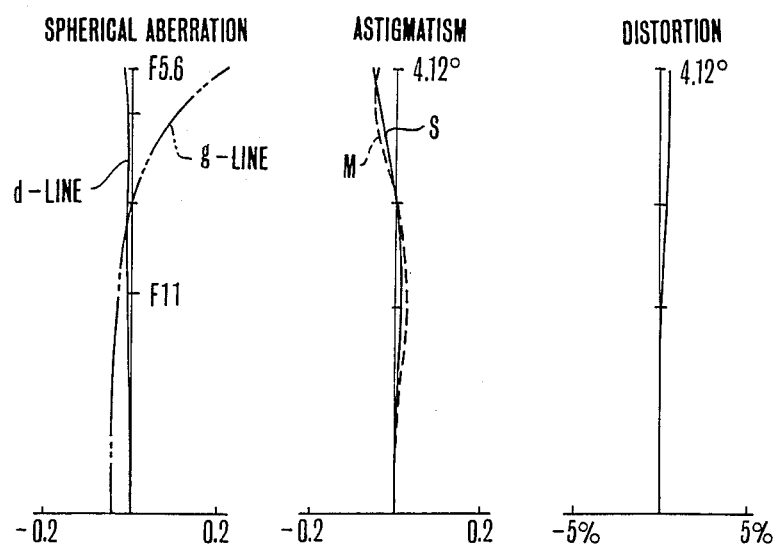
FIG. 2 is aberration curves of the lens of FIG. 1.

In FIG. 1 there is shown a first embodiment of the invention. A front lens unit or group has a positive refractive power and is constructed with, from front to rear, a positive first lens having a front surface of strong curvature convex toward the front, a positive second lens having a front surface of strong curvature convex toward the front, and a negative third lens having its rear surface of strong curvature concave toward the rear. A rear lens unit or group having a negative refractive power is arranged after a large axial air separation from the front lens unit or group and is constructed with, from front to rear, a negative meniscus fourth lens of forward concavity, a negative fifth lens, though shaped to a convex lens, because having a gradient of refractive index with such a cross section that the refractive index increases toward the margin, getting a negative power as the entire lens, and a positive sixth lens. The positive front and negative rear lens units or groups constitute an objective lens of the telephoto type.

We first explain the effects of the negative gradient index lens. Differing from the usual lens of homogeneous medium, the gradient-index lens has its medium acquiring a convergent or divergent action. For a gradient of refractive index given by an expression of $N(h) = N_0 + N_1 h^2 + N_2 h^4 \ldots$ where h is the height from the optical axis, its interior has a power of $-2N_1 D$. In this embodiment, the power of the interior of the gradient-index lens is equal to 1.86 times the overall refractive power of the rear lens unit or groups.

Another feature of the gradient-index lens is that it has an ability to correct aberrations by itself. The ability to correct Petzval sum is particularly excellent. Therefore, the curvature of field which tends to be over-corrected as the total length of the lens system of the telephoto type decreases can be suppressed to a minimum. In more detail, the gradient-index lens produces a Petzval sum P which is related to the refractive power $\phi$ due to the convergent or divergent effect of the interior thereof in terms of the focal length of the entire lens system normalized to unity by $P = \phi/N_0^2$. Because it is inversely proportional to the square of $N_0$, the amount of Petzval sum produced is smaller as compared with the Petzval sum of $P = \phi/N_0$ the usual refracting surface produces. In the case of this embodiment, the amount of Petzval sum produced is smaller in the negative sense. Whilst the spherical system of the same power arrangement as that of this embodiment produces a Petzval sum of as high as $-5.0$ to $-6.0$, the system of the invention has as low a value as $-1.96$ from the above-described reason.

The possibility of reducing the Petzval sum in this embodiment does not merely rely on the replacement of the negative refractive power by the gradient power of the gradient-index lens, but on the formation of the refracting surfaces of the gradient-index lens to relatively strong convex curvatures. This enables its power to be matched to a desired value of the overall power of the rear lens unit or group without the necessity of using a concave surface for bearing its duty but by the gradient power of the gradient-index lens. And, by this technique, a further improvement of the correction of the Petzval sum can be achieved.

In this embodiment, the negative gradient-index lens having a negative gradient power in the rear lens unit or group is formed to the shape of a bi-convex lens. The use of such surfaces and the choice of an appropriate cross section of the gradient of refractive index lead to achieve a further improvement of the spherical aberration, coma and distortion. That is, because the refractive index increases toward the margin in the refracting surface, when it is made convex, the spherical aberration is more under-corrected. Meanwhile, the ray is bent in passing through the interior of the lens, thereby the spherical aberration (the gradient term of the spherical aberration) is over-corrected. Thus, the spherical aberrations from the refracting surface of strong curvature, in this instance, R10, and from the medium cancel each other out. As a result, the spherical aberration of the entire system can be well corrected. From a similar reason, the coma and astigmatism are also well corrected. The distortion is largely under-corrected by the convex surface in which the refractive index increases toward the margin. Therefore, the distortion which tends to become pincushion in the telephoto type is corrected to the opposite direction, or under-corrected.

In such a manner, the use of a radial gradient of refractive index with $N_1 > 0$ or such a cross section that the refractive index increases as the height from the optical axis increases in combination with the convex lens shape when the radial gradient-index lens is formed in the rear lens unit or group of the telephoto type objective lens provides a possibility of correcting the curvature of field to a smaller value than was heretofore possible. Along with this, the spherical aberration, coma and distortion can also be better corrected.

The gradient refractive power of the gradient-index lens can be approximated by $-2N_1D$. As is understandable from this, to obtain the same refractive power, when the lens thickness D is smaller, the $N_1$ must be made larger. This means that the refractive index difference ($\Delta N$) in the gradient is larger. For this reason, when the lens thickness D of the gradient-index lens is determined so as to satisfy the following condition, a better result is obtained:

$$0.02f < D < 0.15f$$

When the lens thickness of the gradient-index lens increases beyond the right hand side of the inequalities of condition, the weight of the lens will become too heavy. Moreover, becauses the $N_1$ becomes smaller, for the gradient becomes weaker, the effect of correcting aberrations by the change of the refractive index on the lens surface is liable to diminish.

NUMERICAL EXAMPLE 1

| F = 100 | | FNO = 1:5.6 | | $2\omega = 8.25°$ | |
|---|---|---|---|---|---|
| R 1 = 16.972 | D 1 = 3.13 | N 1 = 1.49700 | | $\nu$ 1 = 81.6 | |
| R 2 = $-250.729$ | D 2 = 0.03 | | | | |
| R 3 = 16.653 | D 3 = 2.20 | N 2 = 1.48749 | | $\nu$ 2 = 70.2 | |
| R 4 = 49.700 | D 4 = 1.02 | | | | |
| R 5 = $-4471.898$ | D 5 = 0.93 | N 3 = 1.85026 | | $\nu$ 3 = 32.3 | |
| R 6 = 30.705 | D 6 = 20.40 | | | | |
| R 7 = $-8.455$ | D 7 = 0.63 | N 4 = 1.83400 | | $\nu$ 4 = 37.2 | |
| R 8 = $-18.557$ | D 8 = 0.06 | | | | |
| R 9 = 27.070 | D 9 = 5.46 | N 5 = N(h) | | | |
| R10 = $-9.315$ | D10 = 0.06 | | | | |
| R11 = 21.808 | D11 = 0.94 | N 6 = 1.53256 | | $\nu$ 6 = 45.9 | |
| R12 = $-168.376$ | | | | | |

| $N(h) = N_0 + N_1 h^2 + N_2 h^4 = N_3 h^6 + \ldots$ | | |
|---|---|---|
| $N_0$ | $N_1$ | $N_2$ |

| N(h) | d | 1.62004 | $1.52952 \times 10^{-2}$ | $2.63082 \times 10^{-4}$ |
| | g | 1.64209 | $1.55933 \times 10^{-2}$ | $2.54640 \times 10^{-4}$ |

| | | $N_3$ | $N_4$ | $N_5$ |
|---|---|---|---|---|
| N(h) | d | $3.53360 \times 10^{-6}$ | $1.08033 \times 10^{-7}$ | $2.27477 \times 10^{-9}$ |
| | g | $4.74076 \times 10^{-6}$ | $1.11505 \times 10^{-7}$ | $7.80302 \times 10^{-9}$ |

Figure 3:
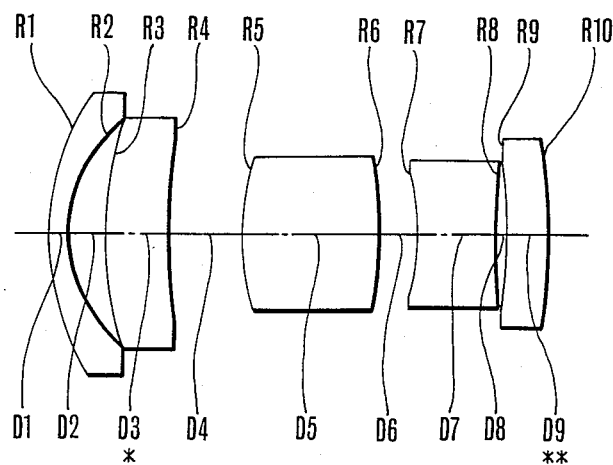
FIG. 3 is a longitudinal section view of a second embodiment of a lens system according to the present invention.
Figure 4:
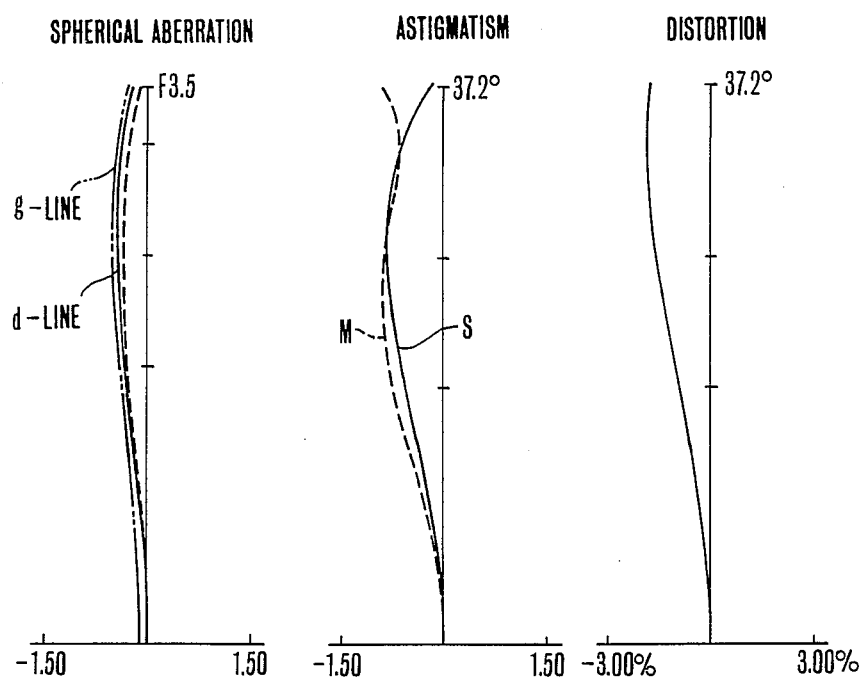
FIG. 4 illustrates aberration curves of the lens of FIG. 2.

A second embodiment of FIG. 3 shows application of a gradient of refractive index to a retrofocus type wide angle lens system. This system is constructed with five lenses constituting five units or groups with inclusion of two gradient-index lenses. The second lens counting from the front is a negative lens having a radial gradient of the divergent type and a convex meniscus form, and the last lens is a positive lens having a radial gradient of the convergent type and a convex meniscus form.

In the retrofocus type lens system of this kind, when the total length and the diameter of the front lens are reduced, the front lens unit or group (in this instance, the first and second lenses) of negative refractive power produces larger aberrations, particularly negative distortion, which are difficult to correct by the entire lens system. In this embodiment, therefore, a gradient of refractive index having a divergent type cross section of index is introduced into the second lens to allow for the making of a convex front surface of the second lens by which the distortion is corrected to the positive direction. As for the other aberrations, the refracting surfaces, particularly the front one, and the gradient of refractive index in the interior of the lens affect them in opposite direction to each other so that they are balanced out as a whole.

Another advantage arising from the introduction of the divergent type radial gradient into the second lens is that as compared with the homogeneous medium, the negative Petzval sum produced from here is reduced. Therefore, by using a lens having the convergent type radial gradient in the last lens, the positive Petzval sum produced here is reduced to correct the curvature of field of the entire system. Further, the positive refractive power is shared between the gradient of refractive index and the refracting surface, and the best use of the aberration correcting effect of the gradient-index lens is made to reduce the number of lens elements. For this portion which would otherwise necessitate two convex meniscus lenses of homogeneous materials is constructed with only one element.

As has been described above, in this embodiment of the invention, by making the best use of the features of the gradient-index lens, a wide angle objective of such a simple structure as five units with five elements and a compact form is realized.

Numerical Example 2

| F = 100. | FNO = 1:3.5 | | $2\omega = 74.4°$ | |
|---|---|---|---|---|
| R 1 = 69.559 | D 1 = 5.26 | N 1 = 1.69680 | $\nu 1 = 55.5$ | |
| R 2 = 38.672 | D 2 = 10.53 | | | |
| R 3 = 101.000 | D 3 = 17.54 | N 2 = N2(h) | | |
| R 4 = 210.222 | D 4 = 20.72 | | | |
| R 5 = 70.057 | D 5 = 38.68 | N 3 = 1.77250 | $\nu 3 = 49.6$ | |
| R 6 = −127.123 | D 6 = 10.35 | | | |
| R 7 = −72.500 | D 7 = 21.05 | N 4 = 1.78472 | $\nu 4 = 25.7$ | |
| R 8 = 275.869 | D 8 = 3.51 | | | |
| R 9 = −189.942 | D 9 = 12.63 | N 5 = N5(h) | | |
| R10 = −118.129 | | | | |

$$Ni(h) = N_0 + N_1 h^2 + N_2 h^4 + N_3 h^6$$

| | | $N_0$ | $N_1$ | $N_2$ |
|---|---|---|---|---|
| N2(h) | d | 1.6 | $2.14880 \times 10^{-4}$ | $2.82539 \times 10^{-8}$ |
| | g | 1.62 | $2.18814 \times 10^{-4}$ | $2.83107 \times 10^{-8}$ |
| N5(h) | d | 1.8 | $-3.89078 \times 10^{-4}$ | $-3.96809 \times 10^{-8}$ |
| | g | 1.822 | $-3.97674 \times 10^{-4}$ | $-3.99732 \times 10^{-8}$ |

| | | $N_3$ |
|---|---|---|
| N2(h) | d | $4.56761 \times 10^{-12}$ |
| | g | $5.34735 \times 10^{-12}$ |
| N5(h) | d | $1.06510 \times 10^{-11}$ |
| | g | $1.04392 \times 10^{-11}$ |

Figure 5:
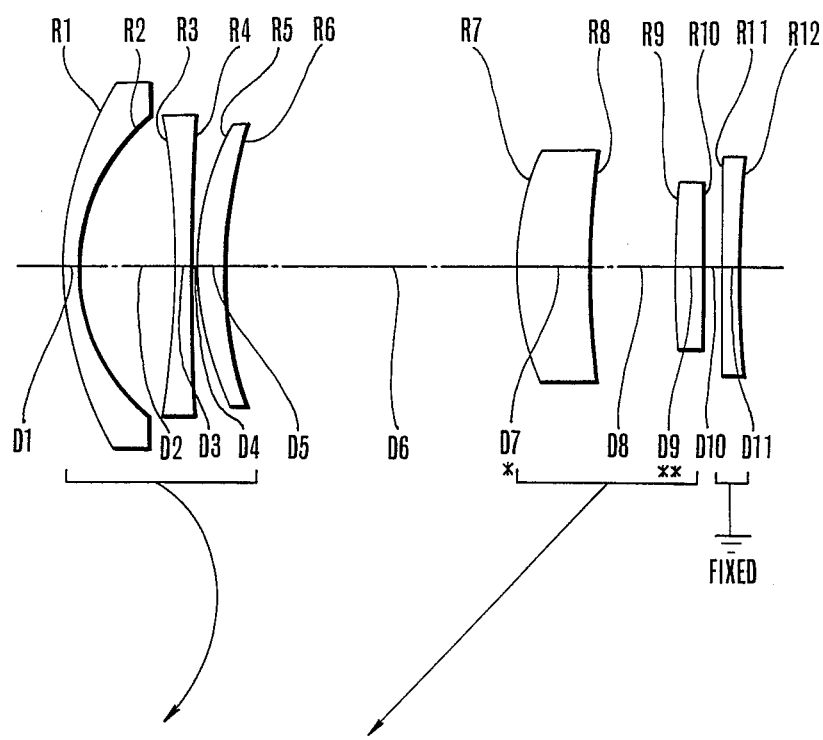
FIG. 5 is a longitudinal section view of a third embodiment of a lens system according to the present invention.
Figure 6:
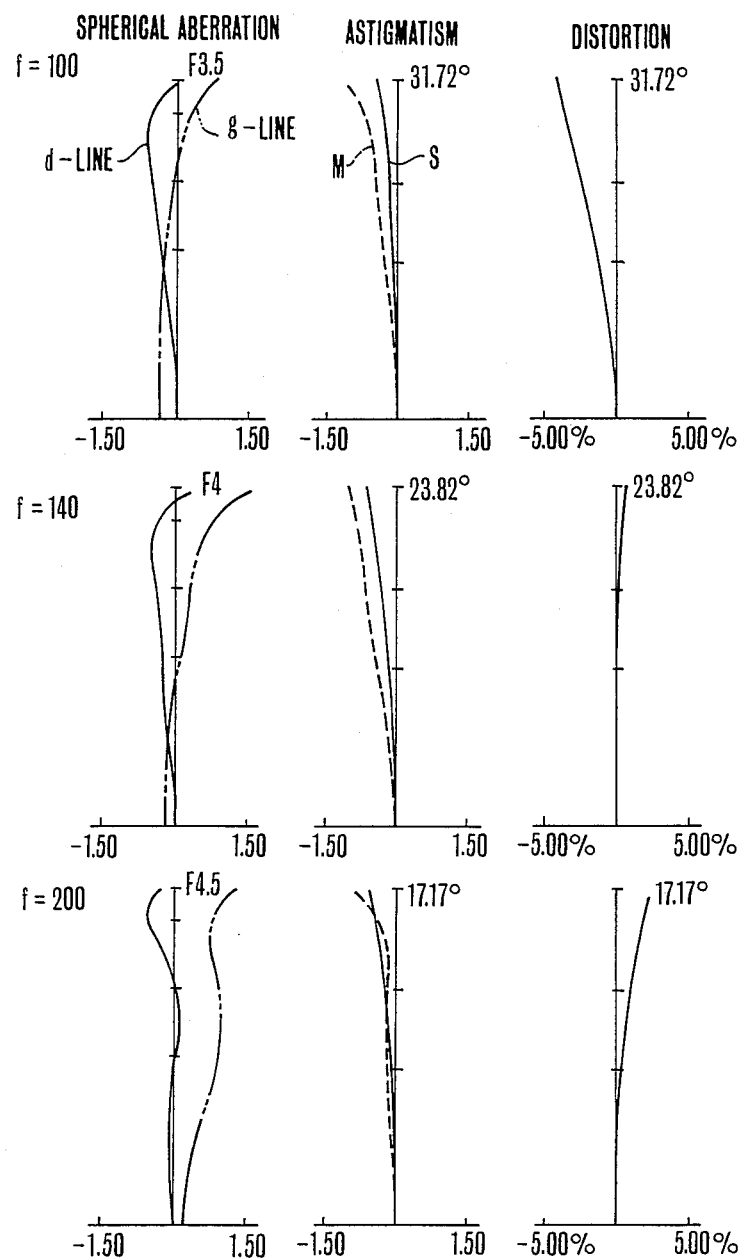
FIG. 6 is illustrates curves of the lens of FIG. 5.

A third embodiment (FIG. 5) of the invention is applied to a zoom lens comprising, from front to rear, a negative first lens unit or group, a positive second lens unit or group, and a negative third lens unit or group. As zooming from the wide angle side to the telephoto side, the separation between the first and second lens units or groups decreases, and the separation between the second and third lens units increases.

The negative third lens unit or group is introduced in order to shorten the optical total length. So, the zoom lens of this embodiment can be said to be of an expanded form of the 2-component zoom lens. In such a type of zoom lens, the total length of the entire system can be very shortened by moving the principal point forward when the positive power is concentrated in the front of the positive second lens unit or group and the negative power is concentrated in the rear. But, as this tendency is strengthened, correction of aberrations becomes difficult.

In this embodiment, the positive second lens unit or group of the aforesaid zoom lens is constructed with two lenses, of which the first, counting from the front, is formed to a convex meniscus shape and has a radial gradient of refractive index in such a cross section that the refractive index decreases toward the margin, or is a gradient-index lens of positive power, and the second has a radial gradient of refractive index in such a cross section that the refractive index increases toward the margin, or a gradient-index lens of negative power.

The front positive lens of the second lens unit or group because of its having decreasing refractive indices with increase in the height from the optical axis, is corrected for spherical aberration in such a way that the usually largely under-corrected spherical aberration by the front surface of that lens is corrected toward over-correction.

The rear lens of the second lens unit or group, though shaped as a convex lens, because of its having a strong gradient of refractive index with the increase of the index toward the margin, has a negative power. And, its refracting surfaces are used for correcting distortion in the wide angle end, and astigmatism in the wide angle and telephoto ends. Also, the rays in passing through the interior of the lens produce over-corrected spherical aberration particularly in the telephoto end, which is cancelled by the under-corrected spherical aberration produced from the convex refracting surface of that lens.

In such a manner, the convergent type radial gradient-index positive lens of convex form is combined with the divergent type radial gradient-index negative lens of convex form, thereby the effect is further improved, permitting a simple structure of the positive second lens unit or group.

Also, a zoom lens well corrected for the various aberrations in all focal lengths can be achieved.

As the advantages of the above arrangement, the positive second lens unit of the 2-unit zoom lens which is usually constructed with five or more lenses can be achieved by as very few a number of constituent lenses as only two. This leads to a large reduction of the weight. Also, the tolerance of the separations between the successive two of the lenses in the positive second unit or group of the 2-unit or group zoom lens and the decentering tolerance are usually very rigorous. If the number of constituent lenses is few as in this embodiment, the assemblying and adjusting operations become very easy.

Since a refractive power can be imparted into even the interior of each of the front and rear lenses of the positive second lens unit, because the positive refractive power on the front side of the center of the positive second lens unit or group and the negative refractive power on the rear side can be strengthened, for the tendency of the positive second lens unit or group toward the telephoto type is strengthened, the position of the principal point can be shifted forward. Also, because of this, the interval between the principal points of the first and second lens units or group can be reduced, and further the focal length of the positive second lens unit or group can be shortened. Thus, a reduction of the optical total length of the entire system has been achieved. Since, at this time, the number of constituent lenses is few and the overall length of the positive second lens unit or group also can be kept small, a necessary value of the lens back in the wide angle end can be secured. Further, the Petzval sum the negative rear lens of the positive second lens unit or group produces is small in negative sense. Therefore, even if the negative refractive power of the rear lens in the positive second lens unit or group is strengthened, the curvature of field never inclines toward over-correction.

NUMERICAL EXAMPLE 3

| F = 100-200 | FNO = 1:3.5-4.5 | | $2\omega$ = 63.44°-34.35° |
|---|---|---|---|
| R 1 = 79.442 | D 1 = 4.27 | N 1 = 1.69680 | $\nu$ 1 = 55.5 |
| R 2 = 45.721 | D 2 = 25.58 | | |
| R 3 = −223.812 | D 3 = 3.72 | N 2 = 1.69680 | $\nu$ 2 = 55.5 |
| R 4 = 458.898 | D 4 = 1.10 | | |
| R 5 = 69.535 | D 5 = 7.35 | N 3 = 1.75520 | $\nu$ 3 = 27.5 |
| R 6 = 98.647 | D 6 = variable | | |
| R 7 = 63.894 | D 7 = 19.38 | N 4 = N4(h) | |
| R 8 = 182.790 | D 8 = 22.76 | | |
| R 9 = 253.153 | D 9 = 7.28 | N 5 = N5(h) | |
| R10 = −3226.156 | D10 = variable | | |
| R11 = 1408.323 | D11 = 4.13 | N 6 = 1.48749 | $\nu$ 6 = 70.2 |
| R12 = 264.158 | | | |

| | 100 | 140 | 200 |
|---|---|---|---|
| D 6 | 77.0198 | 39.0995 | 10.6593 |
| D10 | 4.9553 | 27.9256 | 62.3810 |

$$N_i(h) = N_0 + N_1 h^2 + N_2 h^4 + N_3 h^6 + N_4 h^8 + \ldots$$

| | $\lambda$ | $N_0$ | $N_1$ | $N_2$ |
|---|---|---|---|---|
| N4(h) | d | 1.63854 | $-1.59742 \times 10^{-4}$ | $-6.11417 \times 10^{-8}$ |
| | g | 1.65292 | $-1.57014 \times 10^{-4}$ | $-6.20127 \times 10^{-8}$ |
| N5(h) | d | 1.58313 | $3.53334 \times 10^{-4}$ | $3.46552 \times 10^{-7}$ |
| | g | 1.59529 | $3.59411 \times 10^{-4}$ | $3.8565 \times 10^{-7}$ |

| | $\lambda$ | $N_3$ | $N_4$ |
|---|---|---|---|
| N4(h) | d | $-2.20806 \times 10^{-11}$ | $-1.40928 \times 10^{-14}$ |
| | g | $-1.15164 \times 10^{-11}$ | $-2.18006 \times 10^{-14}$ |
| N5(h) | d | $2.07317 \times 10^{-10}$ | $1.51309 \times 10^{-13}$ |
| | g | $4.5463 \times 10^{-12}$ | $4.54978 \times 10^{-13}$ |

Figure 7:
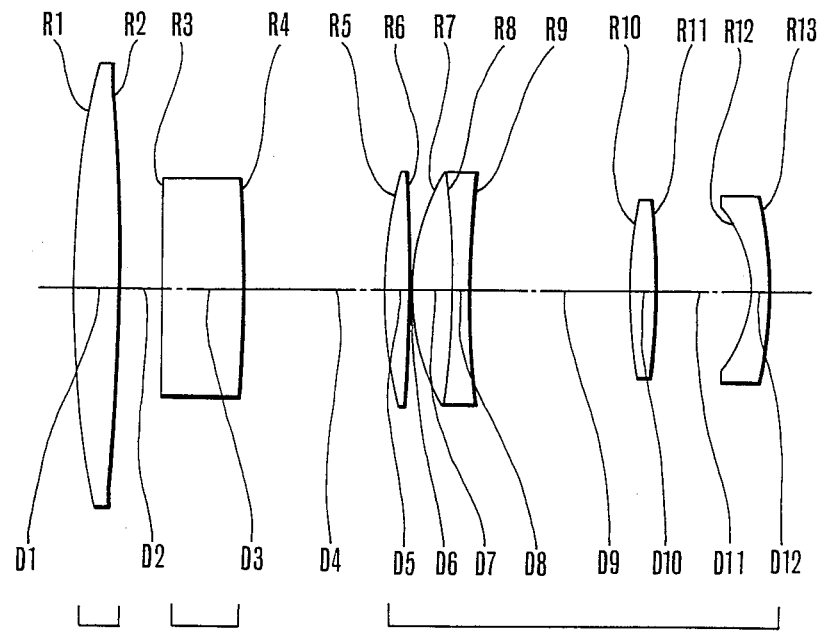
FIG. 7 is a longitudinal section view of a fourth embodiment of a lens system according to the present invention.

FIG. 7 shows a fourth embodiment of the invention applied to a zoom lens comprising, from front to rear, a positive first lens unit or group axially movable during variation of the image magnification, a negative second lens unit or group axially movable during variation of the image magnification to contribute to variation of the image magnification, and a positive third lens unit stationary during variation of the image magnification. A gradient-index lens whose gradient of refractive index is such that the refractive index lowers in the radial direction from the optical axis to the margin is used in the positive first lens unit or group, and a gradient-index negative lens whose lens form is a convex lens, and which has such a gradient of refractive index that the refractive index increases in the radial direction from the optical axis to the margin and has a negative power is used in the negative second lens unit or group. On the other hand, in the positive frontmost lens of the front sub-unit of the positive third lens unit or group stationary during zooming is used a gradient-index lens having such a gradient of refractive index that the refractive index gradually increases in a direction perpendicular to the optical axis from the optical axis to the margin. In the positive lens of a cemented lens adjacent thereto is used an axial gradient-index lens having such a gradient of refractive index that the refractive index lowers in the axial direction from the object side to the image side. Also, in the front one of the two negative lenses of the rear sub-unit is used a gradient-index lens whose lens form is a convex lens and which has such a gradient of refractive index that the refractive index increases in a direction perpendicular to the optical axis from the optical axis to the margin. The concave lens of the cemented lens of the front sub-unit of the positive third lens unit or group, stationary during zooming and the concave lens of the rearmost position of the rear sub-unit are made of optical glasses of homogeneous medium.

When the gradient-index negative lens of the invention is used in the negative second lens unit or group of this embodiment, the Petzval sum, therefore the curvature of field, and spherical aberration, coma and astigmatism can be corrected to a minimum.

As has been described in the first embodiment, if a negative refractive power is given to the gradient power, the production of the negative value of the Petzval sum can be suppressed. The zoom lens of this embodiment also, if of the same power arrangement and if the negative second lens unit or group is constructed with only lenses of homogeneous medium, would have a Petzval sum produced there on the order of −1.45 to −1.6 in terms of the focal length of the entire system normalized to unity. But, when it is constructed with a divergent type radial gradient-index lens as in this embodiment, it becomes possible to reduce the Petzval sum to a very small value of −0.96.

The use of the divergent radial gradient-index lens in the negative second lens unit or group enables the production of the negative value of the Petzval sum to be minimized, and therefore provides a possibility of shortening the optical total length of the entire system when the relay portion is made the tele type with the telephoto ratio reduced to a minimum.

Also, when the divergent type radial gradient-index lens is used in the negative second lens unit and when its lens form is made convex, not only the Petzval sum, but also spherical aberration, coma and astigmatism can be corrected.

That is, in the divergent type radial gradient-index block having such a gradient of refractive index that the refractive index increases as the height from the optical axis increases, when light rays passes through the lens, over-corrected spherical aberration is produced. But, when the refracting surface of the aforesaid block having the gradient of refractive index is made convex, the block has a tendency that, as the height in the refracting surface increases, the light rays are more largely refracted to under-correction than when the medium is homogeneous, thus cancelling the spherical aberration produced from the interior of the lens. As a result, the spherical aberration is well corrected. The coma and astigmatism are also well corrected from a similar reason.

In such a manner, in this embodiment, despite the negative second lens unit or group consists of only one lens, the various aberrations can be well corrected.

Next, the positive third lens unit or group is constructed with a front sub-unit having a positive refractive power and a rear sub-unit having a negative refractive power with the air separation D9 therebetween being longest among those in the positive third lens or group unit. By strengthening the refractive power of each of the aforesaid front and rear sub-units, the total length can be shortened. But, the increase of the positive refractive power of the front sub-unit involves increases of spherical aberration and coma, and the increases of the negative power of the rear sub-unit involves increases of spherical aberration, field curvature and distortion.

In this embodiment, the above-described drawbacks are removed by using a gradient-index lens of the invention even in the front lens of the rear sub-unit of the positive third lens unit or group.

The front lens of the rear sub-unit of the positive third lens unit or group also is a divergent type radial gradient-index lens whose lens form is a convex lens form. Therefore, the production of the negative value of the Petzval sum can be corrected to a minimum, and spherical aberration, coma, and moreover astigmatism and distortion can be corrected. The correction principle of the Petzval sum is similar to that described in connection with the negative second lens unit or group.

When such a surface shape and gradient of refractive index are selected, spherical aberration, coma, distortion and others can be corrected. That is, in the refracting surfaces, the refractive index increases toward the margin. If the surface is convex, the spherical aberration is more under-corrected. Meanwhile, the spherical aberration produced by the bending of the light rays in passing through the interior of the lens (or the gradient term of the spherical aberration) is over-corrected. Therefore, it is cancelled by the spherical aberration produced from the refracting surfaces, particularly R10 of strong curvature. As a result, the spherical aberration of the entire system can be well corrected. The coma and astigmatism also can be corrected well for a similar reason. The distortion is largely bent toward under-correction by the convex surface in which the refractive index increases toward the margin, so that it cancels the pincushion distortion which tends to increase when the telephoto type is used.

Finally, we explain the function of the gradient-index lens of the positive first lens unit or group.

Differing from the usual lens of homogeneous medium, the gradient-index lens has a convergent or divergent action even in the interior thereof and, therefore, a power. As the gradient of refractive index in a direction perpendicular to the optical axis of the gradient-index lens is expressed by $N(h) = H_0 + N_1 h^2 + N_2 h^4 + \ldots$, letting the refractive power of the positive first lens unit or group be denoted by $\phi_I$, and the thickness of the gradient-index lens by D, when the gradient-index lens is given $\phi_I N_1 < 0$, that is, because $\phi_I > 0$, when a gradient of refractive index of $N_1 < 0$ is given, the gradient term of the power of the gradient-index lens has a value of $\phi = -2N_1 D$. Therefore, the positive power of the first lens unit or group is shared between the gradient term of the gradient-index lens and the refracting surfaces. Therefore, the curvature of each of the refracting surfaces can be weakened with decrease of the aberrations.

Also, when the positive first lens unit or group is made a bi-convex lens, and when a gradient of refractive index such that the refractive index lowers toward the refraction is weakened toward the margin, it is advantageous at correction of spherical aberration in the telephoto end. Other aberrations also can be well corrected. Therefore, the positive first lens unit or group can be constructed with only one gradient-index lens.

NUMERICAL EXAMPLE 4

| F = 100 – 249 | FNO = 1:4.5 | $2\omega = 30.8° - 12.6°$ |
|---|---|---|
| R 1 = 152.141 | D 1 = 6.45 | N 1 = N1(h) |
| R 2 = −364.417 | D 2 = variable | |
| R 3 = 1791.055 | D 3 = 11.89 | N 2 = N2(h) |
| R 4 = −232.978 | D 4 = variable | |
| R 5 = 58.465 | D 5 = 3.11 | N 3 = N3(h) |
| R 6 = −310.150 | D 6 = 0.13 | |
| R 7 = 33.218 | D 7 = 5.94 | N 4 = N4(x) |
| R 8 = −105.627 | D 8 = 1.92 | N 5 = 1.76182   $\nu$ 5 = 26.7 |
| R 9 = 144.548 | D 9 = 22.45 | |
| R10 = 78.968 | D10 = 3.74 | N 6 = N6(h) |
| R11 = −129.162 | D11 = 13.14 | |
| R12 = −18.251 | D12 = 2.55 | N 7 = 1.51633   $\nu$ 7 = 65.0 |
| R13 = −63.480 | | |

| f | 100 | 178 | 249 |
|---|---|---|---|
| D 2 | 6.1093 | 60.9511 | 80.5207 |
| D 4 | 19.4808 | 10.5103 | 2.5538 |

$Ni(h) = N_0 + N_1 h^2 + N_2 h^4 + N_3 h^6 + \ldots$
$Ni(x) = N_0 + N_1 x + N_2 x^2 + N_3 x^3 + \ldots$

| | $\lambda$ | $N_0$ | $N_1$ | $N_2$ |
|---|---|---|---|---|
| N1(h) | d | 1.60311 | $-1.03484 \times 10^{-5}$ | $-1.43773 \times 10^{-9}$ |
| | g | 1.61539 | $-1.46124 \times 10^{-6}$ | $7.45671 \times 10^{-9}$ |
| N2(h) | d | 1.51633 | $1.18942 \times 10^{-3}$ | $2.19747 \times 10^{-7}$ |
| | g | 1.52621 | $1.19257 \times 10^{-3}$ | $2.09285 \times 10^{-7}$ |
| N3(h) | d | 1.60311 | $-1.49443 \times 10^{-4}$ | $1.68071 \times 10^{-8}$ |
| | g | 1.61539 | $-1.27794 \times 10^{-4}$ | $4.27907 \times 10^{-8}$ |
| N4(x) | d | 1.60311 | $5.07740 \times 10^{-3}$ | $-3.02946 \times 10^{-4}$ |
| | g | 1.61539 | $3.10865 \times 10^{-3}$ | $-3.06770 \times 10^{-4}$ |
| N6(h) | d | 1.51633 | $5.65029 \times 10^{-4}$ | $1.95324 \times 10^{-6}$ |
| | g | 1.52621 | $5.35259 \times 10^{-4}$ | $1.88101 \times 10^{-6}$ |

| | $\lambda$ | $N_3$ | $N_4$ |
|---|---|---|---|
| N1(h) | d | $-3.77260 \times 10^{-13}$ | $-3.27796 \times 10^{-15}$ |
| | g | $-7.54785 \times 10^{-12}$ | $1.90601 \times 10^{-14}$ |
| N2(h) | d | $1.65968 \times 10^{-10}$ | $-2.56728 \times 10^{-13}$ |
| | g | $1.45862 \times 10^{-10}$ | $-2.57532 \times 10^{-13}$ |
| N3(h) | d | $2.21414 \times 10^{-11}$ | $-7.55521 \times 10^{-14}$ |
| | g | $-2.69545 \times 10^{-11}$ | $-2.73292 \times 10^{-13}$ |
| N4(x) | d | $2.20784 \times 10^{-5}$ | |
| | g | $-3.15046 \times 10^{-6}$ | |
| N6(h) | d | $3.48922 \times 10^{-9}$ | $2.96608 \times 10^{-11}$ |
| | g | $1.63007 \times 10^{-9}$ | $3.22708 \times 10^{-11}$ |

Though in this embodiment, the last lens unit or group remains stationary during zooming, it is even in the variable focal length lens of the type in which the last lens unit or group axially moves with zooming that a similar advantage can be obtained when the gradient-index lens of the invention is used.

Also, even in the 4-unit or group type zoom lens of positive-negative-positive-positive, or positive-negative-negative-positive, or positive-negative-positive-negative power arrangement, a similar advantage can be obtained when the lens according to the invention is used.

For example, the present invention is made the divergent type radial gradient-index lens. Yet, the gradient of refractive index may be in the axial direction. Also when the lens according to the present invention is taken as a key part, and is combined with a lens of positive power whose lens form is a convex lens form and which has such a gradient of refractive index that the refractive index lowers in a direction perpendicular to the optical axis as the height from the optical axis increases, the aberration correcting effect can be further improved. But, other types of gradient-index lenses may well be used to balance out the aberration correction. If the lens form is convex, any of the bi-convex, planoconvex and meniscus types has the effect.

Also, though the foregoing embodiments have been described taking an example of the photographic system, the present invention may be applied to observation systems or illumination systems of microscope, telescope or others.

As has been described above, when the lens according to the invention is used in the position at which a negative power of the lens system is arranged, (i) spherical aberration, coma, astigmatism, and, in some cases, distortion and Petzval sum, can be corrected at a time, thus well correcting the aberrations of the entire lens system.

(ii) Therefore, while the performance of the lens system is kept high, a reduction of the bulk and size can be achieved.

(iii) Also, the lens system can be constructed with a reduced number of constituent lenses.

What is claimed is:

1. An optical system comprising a plurality of lens components, the improvement being that at least one of said lens components is a gradient-index negative lens whose axial thickness is thicker than the marginal thickness and which has a gradient of refractive index with the refractive index increasing in a direction perpendicular to the optical axis as the height from the optical axis increases, so that the lens has a negative power.

2. An optical system according to claim 1, wherein said lens component having the gradient of refractive index is formed to a bi-convex shape.

3. An optical system according to claim 1, wherein said lens component having the gradient of refractive index is formed to a meniscus shape.

4. An optical system composed of a plurality of lens components, comprising:
a gradient-index negative lens component whose axial thickness is thicker than its marginal thickness and which has a gradient of refractive index with the refractive index increasing in a direction perpendicular to an optical axis as the height from the optical axis increases, so that the lens has a negative power, and a gradient index lens of positive refractive power whose axial thickness is thicker than its marginal thickness, and which has a gradient of refractive index with the refractive index decreasing in a direction perpendicular to an optical axis as the height from the optical axis increases, so that the lens has a positive power.

5. A method for correcting the aberrations of such a lens system that the optical path in the lens system has a divergent place and a convergent place and the light rays emerging from the lens system focus an image, wherein a lens component whose axial thickness is thicker than the marginal thickness and which has a gradient of refractive index with the refractive index increasing in a direction perpendicular to an optical axis as the height from the optical axis increases, is arranged in the convergent place of the optical path to cancel the aberrations produced from the other lens components.

* * * * *

UNITED STATES PATENT AND TRADEMARK OFFICE
CERTIFICATE OF CORRECTION

PATENT NO. : 4,859,040
DATED : August 22, 1989
INVENTOR(S) : Nozomu Kitagishi, et al.

It is certified that error appears in the above-identified patent and that said Letters Patent is hereby corrected as shown below:

COLUMN 2:

Line 25, "is illustrates" should read --illustrates aberration--.

Line 29, "illustrates curves" should read --illustrates aberration curves--.

COLUMN 5:

Line 14, "Numerical Example 2" should read --NUMERICAL EXAMPLE 2--.

Line 48, "units" should read --units or groups--.

COLUMN 6:

Line 31, "lens unit of" should read --lens unit or group of--, and "2-unit zoom" should read --2-unit or group zoom--.

Line 45, "unit," should read --unit or group,--.

Line 53, "group" should read --groups--.

COLUMN 7:

Line 34, "unit" should read --unit or group--.

Line 62, "group," should read --group--.

UNITED STATES PATENT AND TRADEMARK OFFICE
CERTIFICATE OF CORRECTION

PATENT NO. : 4,859,040

DATED : August 22, 1989

INVENTOR(S) : Nozomu Kitagishi, et al

It is certified that error appears in the above-identified patent and that said Letters Patent is hereby corrected as shown below:

COLUMN 8:

Line 53, "unit" should read --unit or group--.

Line 60, "passes" should read --pass--.

COLUMN 9:

Line 11, "lens or" should read --lens unit or--.

Line 12, "group unit." should read --group.--.

COLUMN 10:

Line 6, "toward" should read --toward the margin is provided as in the embodiment, because--.

Line 34, "Ni(h)" should read --N1(h)--.

Signed and Sealed this

Seventeenth Day of September, 1991

Attest:

HARRY F. MANBECK, JR.

*Attesting Officer*      *Commissioner of Patents and Trademarks*